Sept. 9, 1947.  K. BUTSCHER  2,427,256
OPTICAL APPARATUS FOR COMPARING OBJECTS
Filed Sept. 11, 1942
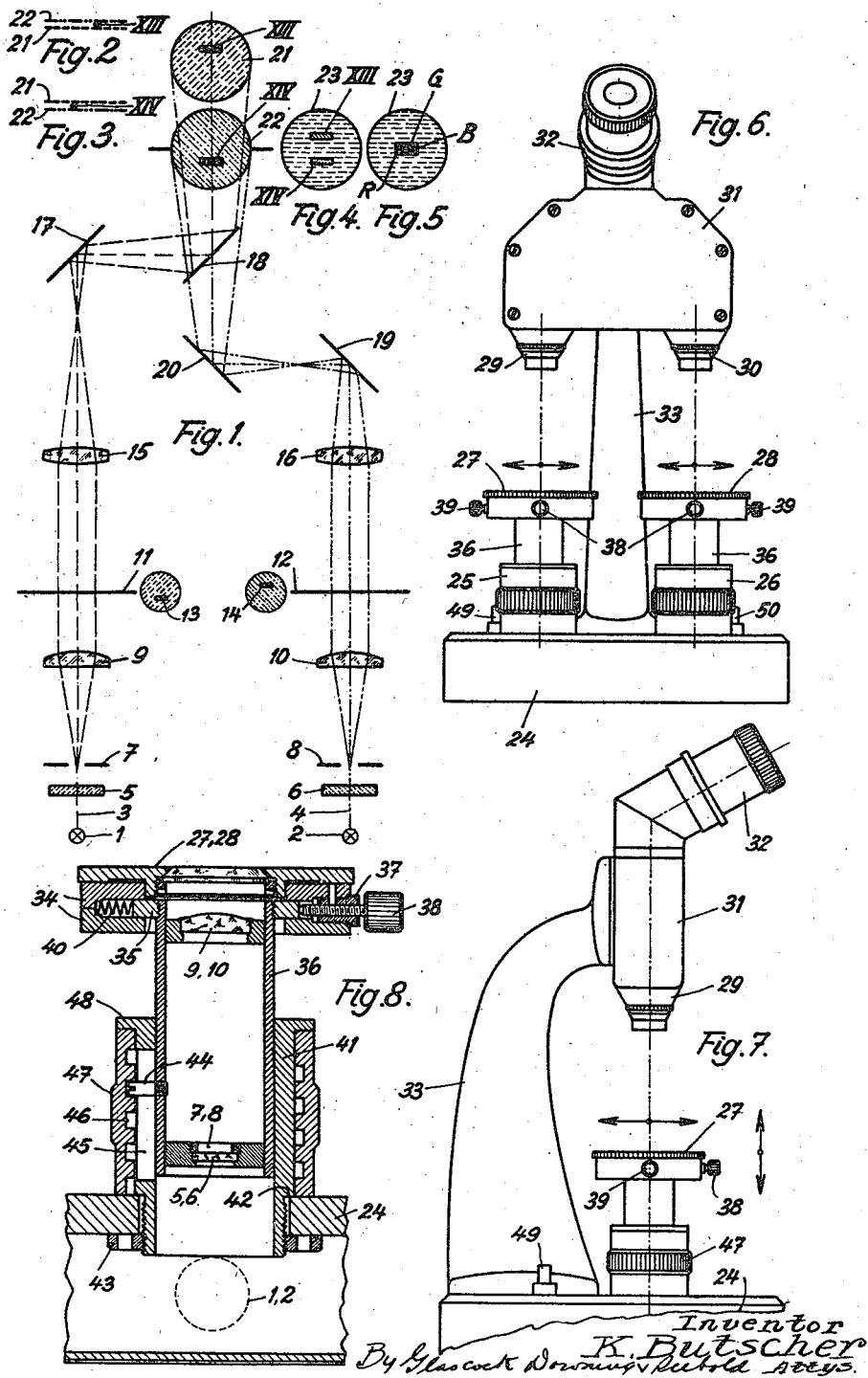

Patented Sept. 9, 1947

2,427,256

UNITED STATES PATENT OFFICE 2,427,256

OPTICAL APPARATUS FOR COMPARING OBJECTS

Karl Butscher, Bienne, Switzerland, assignor to Maschinenfabrik H. Hauser A.-G., Bienne, Switzerland, a joint-stock company of Switzerland Application September 11, 1942, Serial No. 457,988
In Switzerland July 16, 1940

Section 1, Public Law 690, August 8, 1946.
Patent expires July 16, 1960

2 Claims. (Cl. 88—14)

1

The object of the present invention is an optical apparatus for comparing objects.

If in a microscope with two objectives and a common eyepiece two objects, illuminated with white light, are examined, the individual images of these objects have the same colour (a greyish-black) with but slight contrast. If these individual images are superimposed, only those parts of the same are distinct, which lie one upon the other. The mutual deviations of the objects, i. e. the non-superposed equally coloured parts of the images, specially if they are small, can hardly be distinguished and it is almost impossible to make out to which of the two objects to be compared the deviations belong. Thus it would be impossible to make controls in large numbers by which even the smallest deviations of the objects to be tested with regard to the pattern must be rapidly and exactly determined.

The apparatus according to the present invention remedies these inconveniences. This apparatus, specially but not exclusively a microscope is characterized by at least two originally separated paths of luminous beams passing through a common eyepiece, unequally coloured colour filters being inserted into these paths.

Those parts of the images, which are made to lie one upon the other, appear to be black and the parts not lying one upon the other appear as coloured borders around the black image part. As the projecting parts of the one object always appear in one and those of the other object in another colour, the images of the deviations are not only very distinctly contrasted, but it at once becomes apparent to which object they belong.

Other objects and features will be apparent as the following description proceeds, reference being had to the accompanying drawing illustrating, as an example, one embodiment of the apparatus, in the form of a microscope, and in which Fig. 1 is a diagrammatic illustration of the principle of the invention, Figs. 2 to 5 show diagrammatically details of said principle, Fig. 6 is a front view of a microscope.

Fig. 7 is a side elevation of said microscope and

Fig. 8 a central section of an object carrier of the microscope.

In the following description the optical system may first be explained.

In Fig. 1 the numerals 1, 2 designate artificial luminous sources, e. g., incandescent lamps. These latter emit luminous beams 3, 4 which pass through colour filters 5, 6, one of which, 5, may, e. g. be green, and the other, 6, red. Green rays are illustrated by ordinary dash and red rays by dash-double dot lines. Of course, other colours

2 may be used, e. g. orange instead of red and blue in place of green. They must simply be colours distinctly contrasting from each other and from their mixed colour. After the filters the luminous beams, now green and red, pass through the aperture diaphragms 7, 8. These latter lie in the focal planes of the illuminating lenses 9, 10 and produce a luminous beam which is at least approximately parallel. After the illuminating lenses 9, 10 the rays pass through the object planes 11, 12 of the object carriers on which the opaque objects 13, 14 to be compared lie (shown in Fig. 1 by a top view close to the dashes illustrating the object planes). Then the luminous beams go through the objectives 15, 16 and afterwards impinge on the reflecting surfaces 17, 18 and 19, 20 respectively and are thus combined and the images of the objects are seen in the same eyepiece. The reflecting surface 18 is semi-transparent. In the same eyepiece field a green-lighted image field 21 with the image XIII of the object 13 now occurs and a red image field 22 with the image XIV of the object 14. If only the luminous source 1 be switched on, a black image XIII of the object 13 is seen in the green image field 21, or if only the source 2 is switched on, a black image XIV of the object 14 occurs in the red image field 22.

If both luminous sources are simultaneously switched on, an image field 23 with a mixed colour is obtained (Figs. 4 and 5). As red and green are so called complementary colours, the mixed colour is white in the case of white light (daylight) or light yellow to yellow if artificial (electric) light is used. Be it now supposed that the images XIII and XIV on the yellow mixed colour-image field 23 do not yet lie one upon the other (Fig. 4). If one considers, that, e. g. the object 13 does not transmit any light, its image XIII, also on the mixed colour-image field 23, would be black if the red colour 22 of the other luminous beam were not superposed (Fig. 2, the image is here considered as spatial and seen from the side.) Thus it happens that, in the mixed field 23, the image XIII (Fig. 4) of the object 13 lying in the green luminous beam appears red. Correspondingly, the image XIV of the object 14 lying in the red light appears to be green in the mixed image field 23, since the green light 21 is superimposed on the black image (Fig. 3). Thus the colours of the individual images of the objects in the mixed colour-field are interchanged (Fig. 4). These two images now contrast very distinctly in the mixed colour-field both from this latter and from each other.

If the two images shown in Fig. 4 are now superimposed, the superposed parts of these images appear black (Fig. 5), as the superimpositions 22 and 21 seen in Figs. 2 and 3 over the common image again give a neutral mixed colour, while the non-superposed parts still appear in the colours red and green of the individual images in Fig. 4. Therefore, if the two objects to be compared are not exactly equal, the deviation of the two objects from each other are obtained as red and green borders R and G (Fig. 5) around the black common image part B. As these borders contrast very distinctly both from the black common image part B and the mixed colour-image field 23 (yellow in case of electric light), even the slightest deviations can be made out exactly and rapidly, a fact very important in the testing of articles in bulk. If the images were not coloured it would be very difficult to distinguish exactly both the deviations and the object to which the single deviations belong. This, however, can be done very easily and exactly with the help of the above described colouration, on the one hand owing to the distinct contrast and on the other hand because the same colour always belongs to the same object.

In place of artificial light daylight may also be used. Then, however, one is more or less dependent on the position of the apparatus. Instead of two objectives before the reflecting surfaces combining the two luminous beams, a single objective might be provided after these reflecting surfaces. Should more than two objects simultaneously be compared with one another, more than two luminous beams with respective filters must be provided, viz: as many as there are objects to be simultaneously compared.

The microscope illustrated in Figs. 6, 7 and 8 of the drawing, whose optical equipment is constructed according to the above described scheme, has two object carriers 25, 26 mounted on a base plate 24. These carriers differ essentially from those of known microscopes in that their object-plates 27 and 28 are movable both in a horizontal and a vertical direction and are, besides, rotatable. The constructional arrangement will be described later on. Thus, as a sharp focussing of the images is obtained by moving the object, the objectives 29, 30 are mounted immovably on the prism housing 31. The structural arrangement of the objectives and the reflecting surfaces in the housing and of the common eyepiece 32 is carried out in a known manner and, therefore, need not be described. Of importance is solely the fact that the column 33, carrying the prism housing 31, and the object carriers 25, 26 are mounted on the base plate in such a way that all the operating screws of the microscope are easily accessible for manipulation. The column 33 is advantageously disposed behind the object carriers.

The plate 27 (28) is rotatably carried on a two-part carrier 34. This later is slidably mounted on a ring 35 attached to the tube 36. Adjusting screws 38, 39 are screwed into two bushings 37 mutually displaced by a certain angle, e. g. 90° (in Fig. 8 only the one of these bushings is to be seen). Diametrically opposite to these adjusting screws springs 40 are inserted, acting against the adjusting screws. These adjusting screws and springs enable the plate to be moved in two directions, e. g. perpendicularly to each other. The tube 36 is, with allowance for vertical adjustment, inserted in a sleeve 41. This sleeve 41 provided with a shoulder 42 is fixed to the base plate 24 by means of a screw nut 43. The following construction enables the tube to be vertically adjusted. Into the tube 36 is screwed a guide pin 44 passing through a slot 45 of the sleeve 41 and engaging a female thread 46 of the adjusting member 47. The tube 36 is vertically adjusted by rotating this adjusting member 47 held between the flange 48 of the sleeve 41 and the base plate 24. The aperture diaphragm 7 (8), the colour filter 5 (6) mounted on said diaphragm, and the illuminating lens 9 (10) are inserted into this tube 36, while the luminous source 1 (2) is located under the tube in the interior of the base plate 24. The luminous sources are switched on and off by means of the push button switches 49, 50. The filters may be placed anywhere in the path of the luminous beams; owing to structural reasons, however, they are advantageously disposed close to the luminous source, i. e. in the tube of the object carrier.

For the comparative measurement of two objects the same are placed on the plates 27, 28 of the object carriers and then the illuminating device is switched on. The images of these objects are now seen in the eyepiece on the mixed colour-image field in two different colours. The images are focussed by rotating the adjusting member 47. Then the plates 27 and 28 are turned and the adjusting screws 38, 39 moved until the images cover each other as far as possible. Parts of the objects deviating from one another are then to be seen as coloured borders on the black common image, whereby it may at once be recognized by the kind of colour which object has parts projecting beyond the other object (Fig. 5).

What I claim is:

1. In an optical apparatus for comparing objects, an eyepiece, means for forming two originally separated paths of luminous beams, means for combining said beams in said eyepiece, differently colored filters in said paths, vertically adjustable tubes in said paths, rotatable and horizontally shiftable plates mounted on said tubes having light transmitting portions aligned with said tubes, and an illuminating lens in each of said tubes, said color filters being located in said tubes.

2. In an optical apparatus for comparing objects, an eyepiece, means for forming two originally separated paths of luminous beams, means for combining said beams in said eyepiece, rotatable and horizontally and vertically shiftable object carriers inserted into said paths, each comprising a vertically shiftable tube and a rotatable and horizontally shiftable plate mounted on said tube, having a light transmitting portion aligned with said said tube, an aperture diaphragm in said tube, and differently colored filters in said aperture diaphragms.

KARL BUTSCHER.

REFERENCES CITED

The following references are of record in the file of this patent:

UNITED STATES PATENTS

| Number | Name | Date |
| --- | --- | --- |
| 1,080,968 | Hayes | Dec. 9, 1913 |
| 1,161,848 | Cornell et al. | Nov. 30, 1915 |
| 1,371,458 | Wilson | Mar. 15, 1921 |
| 1,798,634 | Schafer | Mar. 31, 1931 |

OTHER REFERENCES

"The New Comparison Microscope," published in 1932 by Bausch & Lomb Optical Co., Rochester, New York. Pages 6 and 7 cited.